(12) United States Patent
Hauser et al.

(10) Patent No.: US 7,984,662 B1
(45) Date of Patent: Jul. 26, 2011

(54) VEHICLE DIRECTION SENSING MECHANISM

(75) Inventors: Raymond Hauser, Sullivan, IL (US);
Lonnie E. Holder, Sullivan, IL (US);
Scott W. Keller, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 2019 days.

(21) Appl. No.: 10/986,688

(22) Filed: Nov. 12, 2004

Related U.S. Application Data (60) Provisional application No. 60/520,747, filed on Nov. 17, 2003.

(51) Int. Cl.
*B60K 20/00* (2006.01)
*A01D 41/14* (2006.01)

(52) U.S. Cl. .................... 74/473.21; 56/10.2 R
(58) Field of Classification Search .............. 324/207.2, 324/207.25, 207.26, 174; 73/514.31, 514.39; 123/612, 617; 200/61.46, 61.48, 61.39, 61.85, 200/61.88, 570; 56/10.2 R–11.7 R; 74/10.22, 74/814, 473.1, 473.21, 473.22, 473.23
See application file for complete search history.

(56) References Cited

U.S. PATENT DOCUMENTS

| | | | |
|---|---|---|---|
| 2,754,384 A | | 7/1956 | Atkinson |
| 2,972,027 A | * | 2/1961 | Henry-Biabaud ......... 200/61.46 |
| 3,222,636 A | * | 12/1965 | Melton ......................... 367/179 |
| 3,716,768 A | | 2/1973 | Mason |
| 3,736,729 A | | 6/1973 | Peterson |
| 3,827,024 A | | 7/1974 | Anderson et al. |
| 3,953,691 A | * | 4/1976 | Grosseau ................... 200/61.46 |
| 3,984,967 A | | 10/1976 | Jones |
| 3,999,643 A | | 12/1976 | Jones |
| 4,231,217 A | | 11/1980 | Lucasa |
| 4,378,855 A | | 4/1983 | Haub et al. |
| 5,079,969 A | | 1/1992 | Kato et al. |
| 5,101,802 A | | 4/1992 | Reinhard |
| 5,174,115 A | | 12/1992 | Jacobson et al. |
| 5,314,038 A | | 5/1994 | Peterson, Jr. |
| 5,314,387 A | | 5/1994 | Hauser et al. |
| 5,436,419 A | | 7/1995 | Welscher et al. |
| 5,438,831 A | | 8/1995 | Okada |
| 5,540,037 A | | 7/1996 | Lamb et al. |
| 5,586,955 A | | 12/1996 | Wanie |
| 5,601,512 A | | 2/1997 | Scag |
| 5,616,964 A | | 4/1997 | Peterson, Jr. |
| 5,743,247 A | | 4/1998 | Kingsley et al. |
| 5,934,051 A | | 8/1999 | Hahn |
| 5,994,857 A | | 11/1999 | Peterson, Jr. et al. |
| 6,026,634 A | | 2/2000 | Peter et al. |
| 6,085,502 A | | 7/2000 | Wians et al. |
| 6,105,348 A | | 8/2000 | Turk et al. |
| 6,109,009 A | | 8/2000 | Benson |
| 6,109,010 A | | 8/2000 | Heal et al. |
| 6,158,278 A | * | 12/2000 | Klinefelter ................. 73/170.05 |
| 6,253,637 B1 | | 7/2001 | Hauser et al. |
| 6,275,025 B1 | * | 8/2001 | Wiese ........................ 324/207.2 |
| 6,301,885 B1 | | 10/2001 | Johnson et al. |

(Continued)

*Primary Examiner* — Thomas R Hannon
*Assistant Examiner* — Alan B Waits
(74) *Attorney, Agent, or Firm* — Neal Gerber & Eisenberg LLP (57) ABSTRACT

A mechanism for sensing the direction of a vehicle, or other application using a drive device such as a hydrostatic transmission. An actuation mechanism is mounted to a rotatable shaft or gear in the drive device and has an actuated position when the shaft or gear is rotating in a first direction and an unactuated position when the shaft or gear is rotating in the opposite direction.

32 Claims, 13 Drawing Sheets

U.S. PATENT DOCUMENTS

| | | |
|---|---|---|
| 6,316,891 B1 | 11/2001 | Hough |
| 6,339,916 B1 | 1/2002 | Benson |
| 6,378,300 B1 | 4/2002 | Johnson et al. |
| 6,400,144 B1 * | 6/2002 | Hannewald et al. ..... 324/207.25 |
| 6,405,513 B1 | 6/2002 | Hancock et al. |
| 6,437,458 B1 | 8/2002 | Baggett |
| 6,510,838 B2 * | 1/2003 | Hur .................. 123/339.16 |
| 6,513,310 B1 | 2/2003 | Hancock et al. |
| 6,539,713 B2 | 4/2003 | Johnson et al. |
| 6,568,162 B2 | 5/2003 | Walters |
| 6,591,594 B2 | 7/2003 | Hancock et al. |
| 6,609,357 B1 | 8/2003 | Davis et al. |
| 6,625,963 B2 | 9/2003 | Johnson |
| 6,698,198 B1 | 3/2004 | Schreier |
| 6,708,472 B2 | 3/2004 | Hancock et al. |
| 6,720,679 B2 | 4/2004 | Harada et al. |
| 6,758,292 B2 | 7/2004 | Shoemaker |
| 6,873,084 B2 * | 3/2005 | Richard ................ 310/239 |
| 6,880,333 B1 | 4/2005 | Taylor et al. |
| 6,880,686 B1 | 4/2005 | Hauser et al. |
| 6,886,315 B1 | 5/2005 | Hauser et al. |
| 6,935,106 B2 | 8/2005 | Korthals |
| 6,951,093 B1 | 10/2005 | Hauser et al. |
| 7,017,326 B1 | 3/2006 | Keller et al. |
| 7,032,377 B1 | 4/2006 | Keller et al. |
| 7,104,036 B2 | 9/2006 | Trefz |
| 7,126,237 B2 | 10/2006 | Walters et al. |
| 7,128,177 B2 | 10/2006 | Harvey et al. |
| 7,131,267 B1 | 11/2006 | Keller et al. |
| 7,131,509 B2 | 11/2006 | Harvey et al. |
| 7,224,088 B2 | 5/2007 | Shoemaker et al. |
| 7,237,633 B2 | 7/2007 | Straka et al. |
| 7,266,938 B1 | 9/2007 | Hauser et al. |
| 7,313,914 B1 | 1/2008 | Reid et al. |
| 7,422,078 B2 | 9/2008 | Straka et al. |
| 7,473,207 B1 | 1/2009 | Hauser et al. |
| 7,503,174 B1 | 3/2009 | Reid et al. |
| 7,513,322 B2 | 4/2009 | Straka et al. |
| 7,523,796 B2 | 4/2009 | Onderko et al. |
| 2001/0042363 A1 | 11/2001 | Walters |
| 2002/0005780 A1 | 1/2002 | Ehrlich et al. |
| 2004/0088960 A1 | 5/2004 | Johnson et al. |
| 2004/0103659 A1 | 6/2004 | Johnson et al. |

* cited by examiner

VEHICLE DIRECTION SENSING MECHANISM

CROSS REFERENCE

This application claims the priority of U.S. Provisional Patent Application No. 60/520,747, filed on Nov. 17, 2003.

BACKGROUND OF THE INVENTION

This invention relates generally to drive devices, and more particularly, to a mechanism for sensing the direction of rotation of elements within or related to a drive device. This invention may be used with a variety of drive devices including without limitation hydrostatic transmissions, which also come in a variety of configurations, including parallel pump and motor, dual pump and motor, and configurations where the hydrostatic transmission is incorporated within a housing containing gearing, often known as an integrated hydrostatic transaxle or IHT.

SUMMARY OF THE INVENTION

The invention disclosed herein comprises a mechanism for sensing the direction of rotation of a drive device. This sensing mechanism may be mounted to a drive device, such as a hydraulic pump, transaxle or transmission, for controlling a vehicle function dependent on the direction of rotation of an element within that drive device.

An electrical signal from this mechanism may be used to disconnect power to a mower blade clutch or other device or vehicle system whenever the vehicle is operated in reverse. By way of example, but not limitation, this system could also be used with a backup warning system to generate a visual and/or auditory signal that the vehicle is in reverse, or with a snow thrower to switch off the snow thrower blades when the vehicle is moving in reverse, or with a mowing operation, to require the mowing operation to cease when the vehicle is traveling in a reverse direction. This invention can be used in any application where the direction of rotation of a shaft or gear in the drive device is important.

In the preferred embodiment, the direction sensing mechanism is located internal to an oil-filled drive device and relies on the actual rotation of a gear train shaft or gear to define reverse movement of the vehicle.

Most of the embodiments described herein show a switch that is triggered when the transmission rotates an output shaft in the reverse direction in order to disable a vehicle system or output device (such as the mower blade) when the vehicle is moving in reverse. It will be understood, however, that it may be desired to have the switch triggered when the output shaft is rotated in forward to activate or deactivate an appropriate vehicle system.

Other benefits and objects of this invention are disclosed herein and will be obvious to readers of ordinary skill in the art. The features disclosed herein can be combined to create a unique design; it is understood, however, that such features are unique in their own right and can be used independently with other transmission transaxle or vehicle designs, as will be obvious to one of ordinary skill in the art.

DETAILED DESCRIPTION OF THE DRAWINGS

This invention is described herein with respect to a vehicle including an integrated hydrostatic transaxle, but it will be understood that this invention is not limited to such an application. Multiple embodiments of this invention are depicted in the figures and described below. Identical structure in the different embodiments is given identical numerals throughout; where appropriate, different prefixes are used to differentiate between structure that is similar but not identical.

Figure 1:
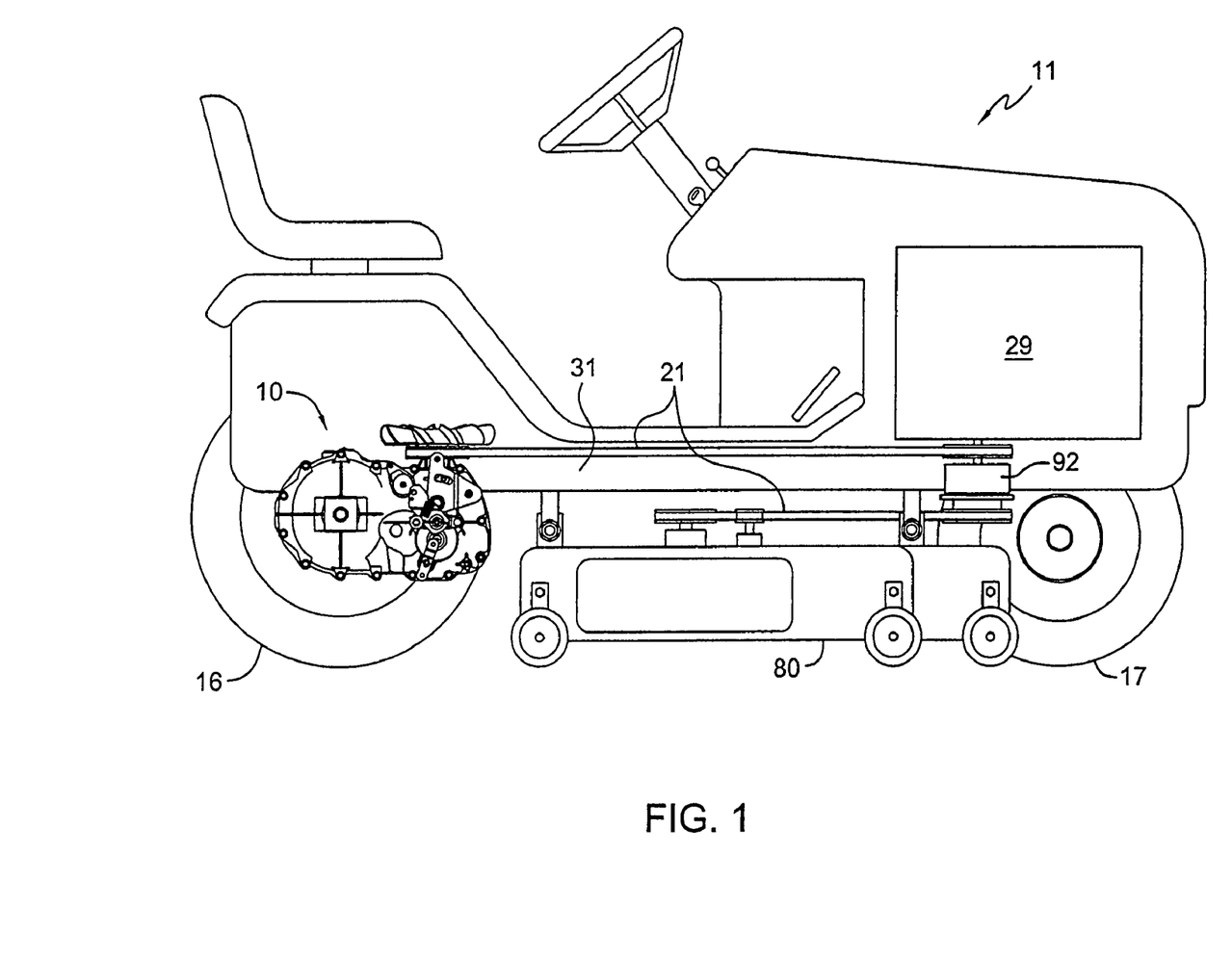
FIG. 1 is a side elevational view of a vehicle including a transaxle incorporating the present invention.

FIG. 1 shows a typical vehicle 11 having an engine 29 mounted on a vehicle frame 31, rear drive wheels 16 and front steering wheels 17; one of each wheels 16 and 17 have been removed from this figure for clarity. A hydrostatic transaxle 10 is mounted towards the rear of the vehicle to power both drive wheels 16 by means of a belt drive system 21 which also powers a mower deck 80 through a clutch 92. All of these elements and the interconnections therebetween are well-known in the art and will not be described in detail. Transaxle 10 is shown in more detail in FIGS. 2 and 3; this transaxle depicted herein is similar to that shown in U.S. Pat. No. 6,253,637, the terms of which are incorporated herein by reference.

Figure 2:
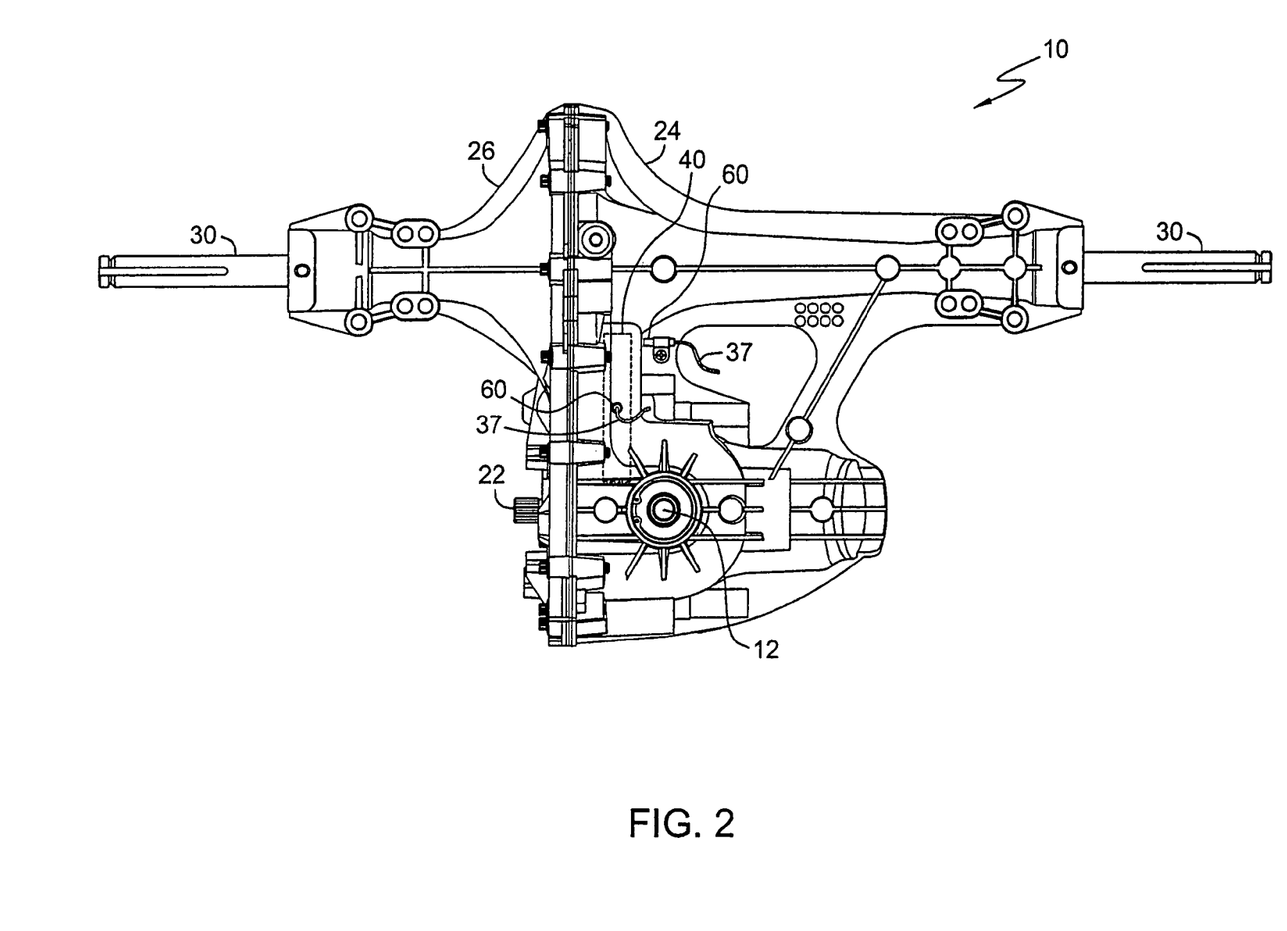
FIG. 2 is a top plan view of the hydrostatic transaxle shown in FIG. 1.
Figure 3:
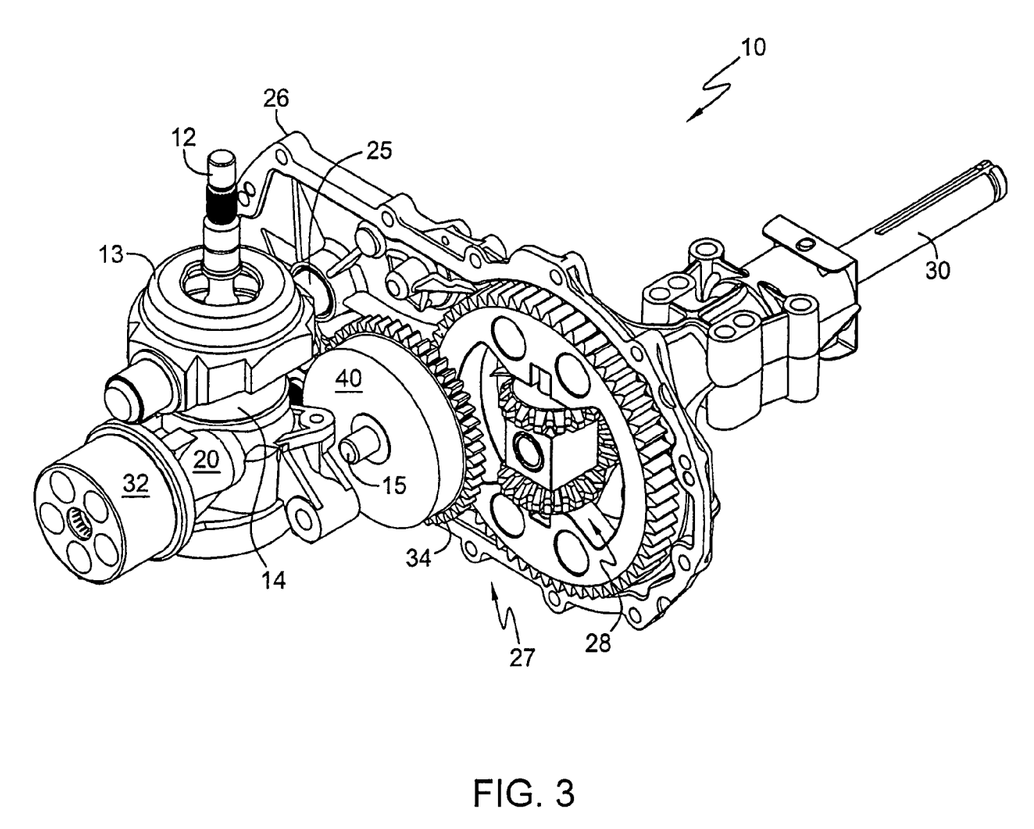
FIG. 3 is a perspective view of a portion of the hydrostatic transaxle shown in FIG. 2 with certain portions, including one housing, removed for clarity.

The operation of transaxle 10 is also well known and will not be described in detail herein. Hydrostatic transaxle 10 comprises hydraulic and gear elements located inside a housing formed by casing members 24 and 26. Casing members 24 and 26 will generally be filled with a hydraulic fluid. A hydrostatic pump assembly 14 is mounted on a center section 20 and driven by input shaft 12. Swash plate apparatus 13 is moved by means of trunnion 25 and controls the output of hydraulic pump assembly 14, which controls the speed and direction of hydraulic motor 32, which in turn drives motor shaft 22.

Power is transmitted through a gear train 27 including a reduction gear shaft 15 to a differential 28, which in turn drives output axles 30. As shown in FIG. 3, direction sensing mechanism 40 may be located on reduction gear shaft 15 adjacent to reduction gear 34. As will be understood from the subsequent description, mechanism 40 may be located on or adjacent to any rotating element, for example a gear or a shaft, subject to the guidance provided herein. Mechanism 40 is shown as a volume in FIG. 3 to minimize the complexity of this figure, and the actual mechanism would be as shown in subsequent figures.

Figure 4:
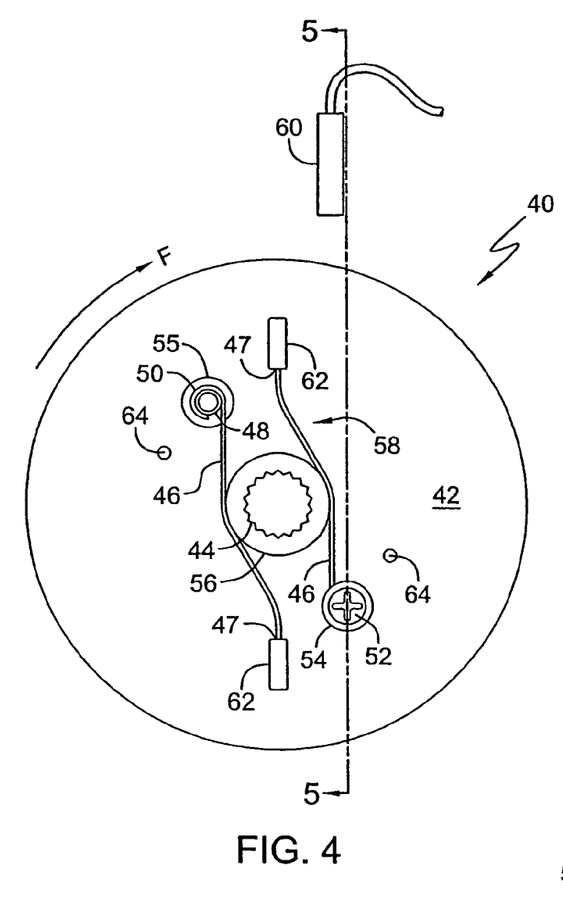
FIG. 4 is a side elevational view of a first embodiment of the rotating element of a direction sensing mechanism with the mechanism rotating in the forward direction.
Figure 5:
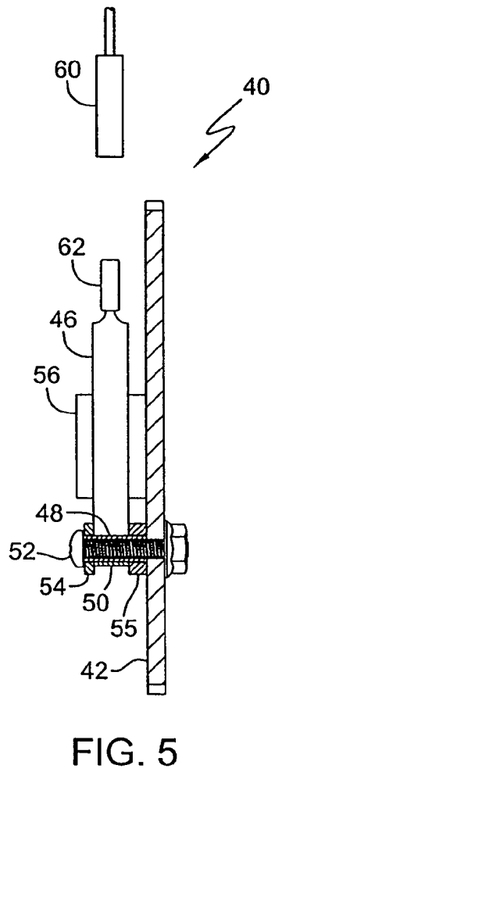
FIG. 5 is a cross-sectional view of the rotating element shown in FIG. 4 along the lines 5-5.

FIGS. 4 to 7 show a first embodiment of direction sensing mechanism 40. In this embodiment all the components are mounted on a circular base 42, which may be mounted to a shaft by means of splines 44. FIG. 4 shows the elements of this embodiment as they would appear when mechanism 40 is rotating clockwise in a first direction, which will be described as the forward direction though it could also be the reverse direction. Two arms 46 are rotatably mounted to pivots 48 that may be attached to base 42 by a variety of means, including press fit, welding, brazing and the like. In the embodiment shown a circularly formed portion 50 on each arm 46 is mated with a pivot 48, and a fastener 52 constrains arm 46. The head of fastener 52 stops against pivot 48 with clearance for the components captured between base 42 and fastener 52 so that those components, which includes arm 46, washer 54 and washer 55, freely rotate as required. The head of one fastener 52 along with its associated washer 54 have been removed to better show the configuration of circular portion 50 and pivot 48. FIG. 5 shows a section of mechanism 40; the second arm 46 in the background of FIG. 5 and all the components associated with that arm 46 have been removed from this figure for clarity.

As previously noted, casings 24 and 26 are generally filled with hydraulic fluid. As base 42 rotates clockwise within this hydraulic fluid that fluid pushes against arms 46, forcing arms 46 toward hub 56, which also acts as a stop for arms 46. Arms 46 may further comprise one or more curves 58 to act as a hydro-dynamically resistive surface such that the hydraulic fluid in which mechanism 40 operates helps to push arms 46 against stop 56. Such additional assistance may be required depending on the speed at which mechanism 40 rotates as arms 46 will be subjected to a centrifugal effect and may try to swing outwardly away from hub 56. Further, arms 46 are preferably comprised of a lightweight material such as a polymer or aluminum to minimize the centrifugal effect and thus allow the resistance of arms 46 to hydraulic fluid to maintain arms 46 against hub 56.

As shown in FIG. 2 and FIG. 4, there is a magnetically affected switch such as a reed switch or hall switch 60 positioned proximate to mechanism 40. As will be discussed in detail below, FIG. 2 shows two exemplary positions for switch 60. The strength of magnet 62 is such that when arms 46 are oriented against stop 56 switch 60 will not be actuated. Because the strength of magnet 62 may be varied as well as the sensitivity of switch 60, switch 60 may be positioned completely exterior to casings 24 and 26, or within the interior of casings 24 and 26. The casing in which mechanism 40 is located must be of a material that minimally affects the magnetic field of magnet 62 to assure reliable actuation of switch 60. Suitable housing materials include, but are not limited to, aluminum, zinc or plastic. Magnet 62 has a central opening 47 that allows a portion of arm 46 to be inserted into it. Other techniques for mounting magnet 62 also exist; for example, adherence by gluing or forming magnet 62 within arm 46. Magnet 62 is preferably cylindrical in shape so that magnet 62 does not present excessive resistance to fluid flow such that arm 46 might be permanently deformed during operation in the forward direction.

Figure 6:
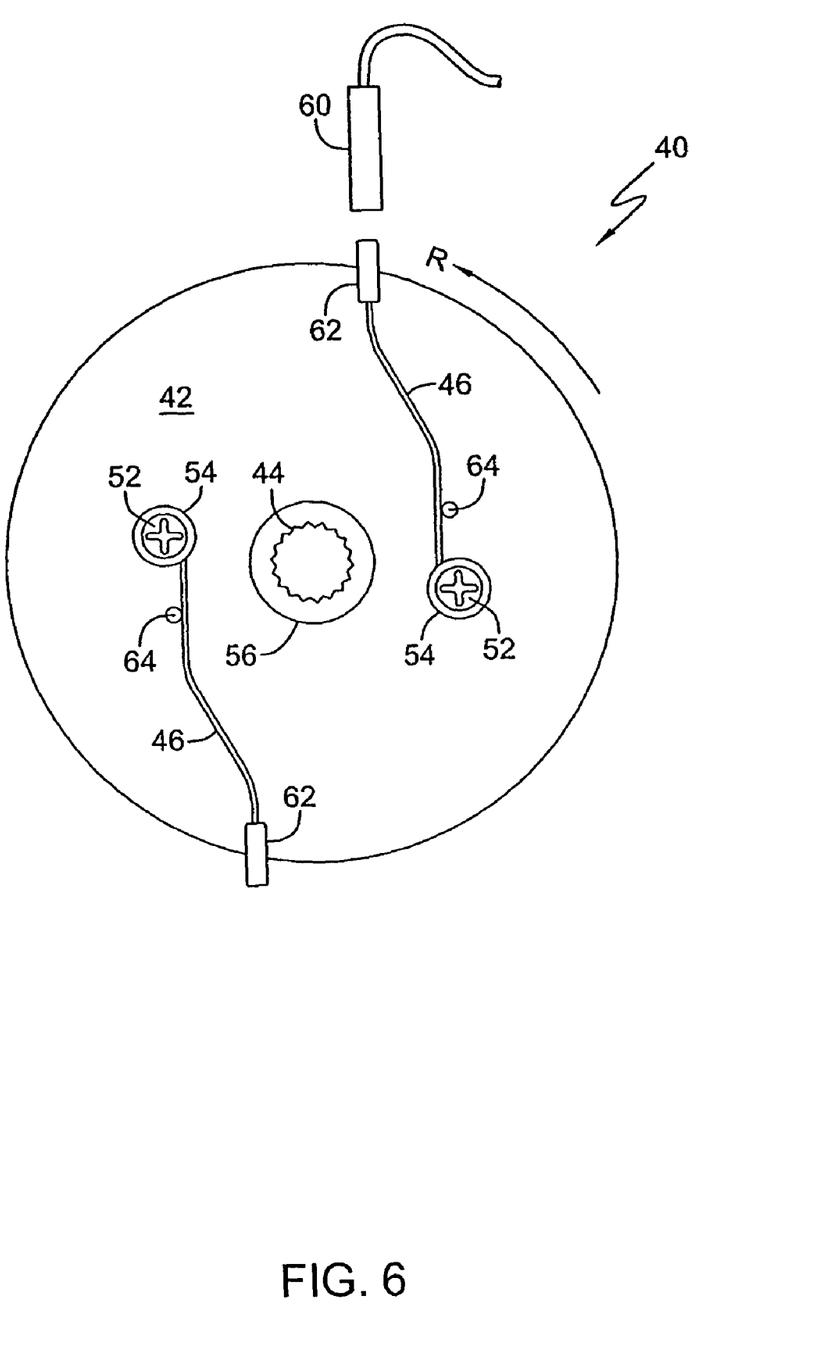
FIG. 6 is a side elevational view of a first embodiment of the rotating element of a direction sensing mechanism with the mechanism rotating in the reverse direction.

FIG. 6 depicts operation of mechanism 40 in a second counterclockwise direction, defined as reverse for this description. As base 42 rotates in reverse, resistance to hydraulic fluid flow causes arms 46 to move toward stops 64, which are shown pressed into base 42, but may be welded, fastened or mated with base 42 in a variety of known techniques. With arms 46 oriented as shown in FIG. 6, magnet 62 will be positioned such that switch 60 will be actuated as magnet 62 passes by switch 60.

Figure 7:
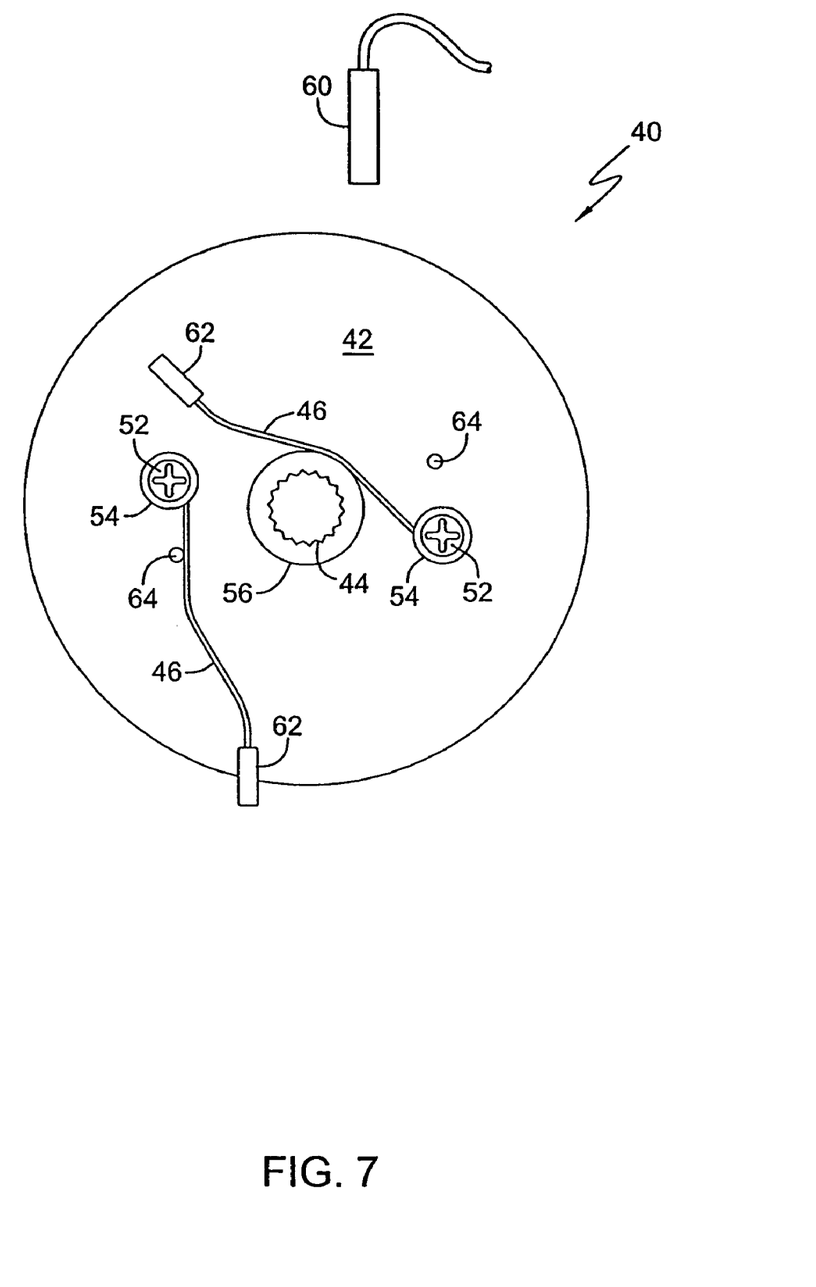
FIG. 7 is a side elevational view of a first embodiment of the rotating element of a direction sensing mechanism with the mechanism stationary.

If mechanism 40 should stop rotating when arms 46 are positioned as shown in FIG. 6, it may be desirable to indicate that such rotation has stopped. Thus, in a preferred embodiment, mechanism 40 is designed so that when mechanism 40 stops arm 46 is balanced so that gravity will move arm 46 against stop 56 as shown in FIG. 7, thus deactivating switch 60. Furthermore, switch 60 is positioned such that when mechanism 40 stops moving while arms 46 are in the actuated position, either arm 46 will be past the point wherein the magnetic field of magnet 62 will actuate switch 60 or arm 46 will be balanced such that gravity moves arm 46 to position magnet 62 away from switch 60, deactivating switch 60.

Figure 8:
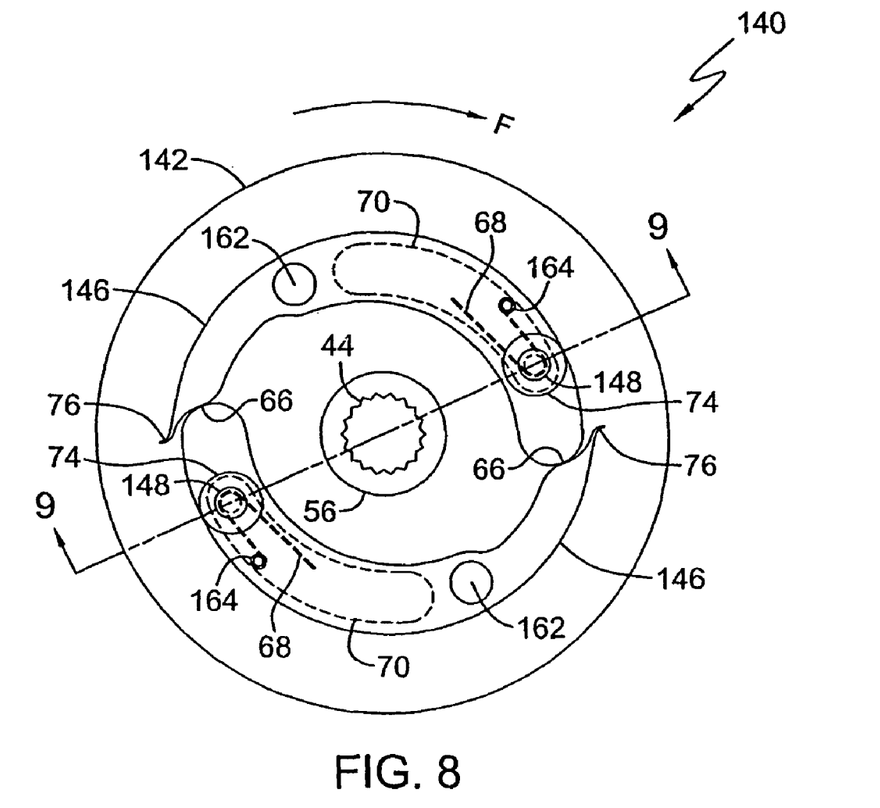
FIG. 8 is a side elevational view of a second embodiment of the rotating element of a direction sensing mechanism with the mechanism rotating in the forward direction.
Figure 9:
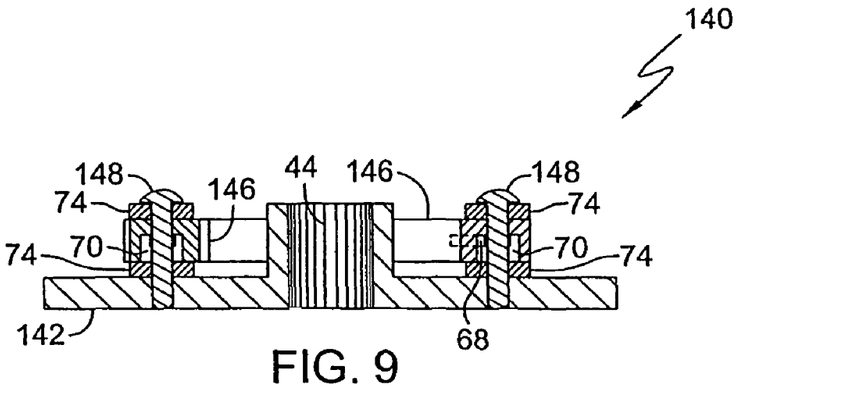
FIG. 9 is a cross-sectional view of the rotating element shown in FIG. 8 along the lines 9-9.
Figure 10:
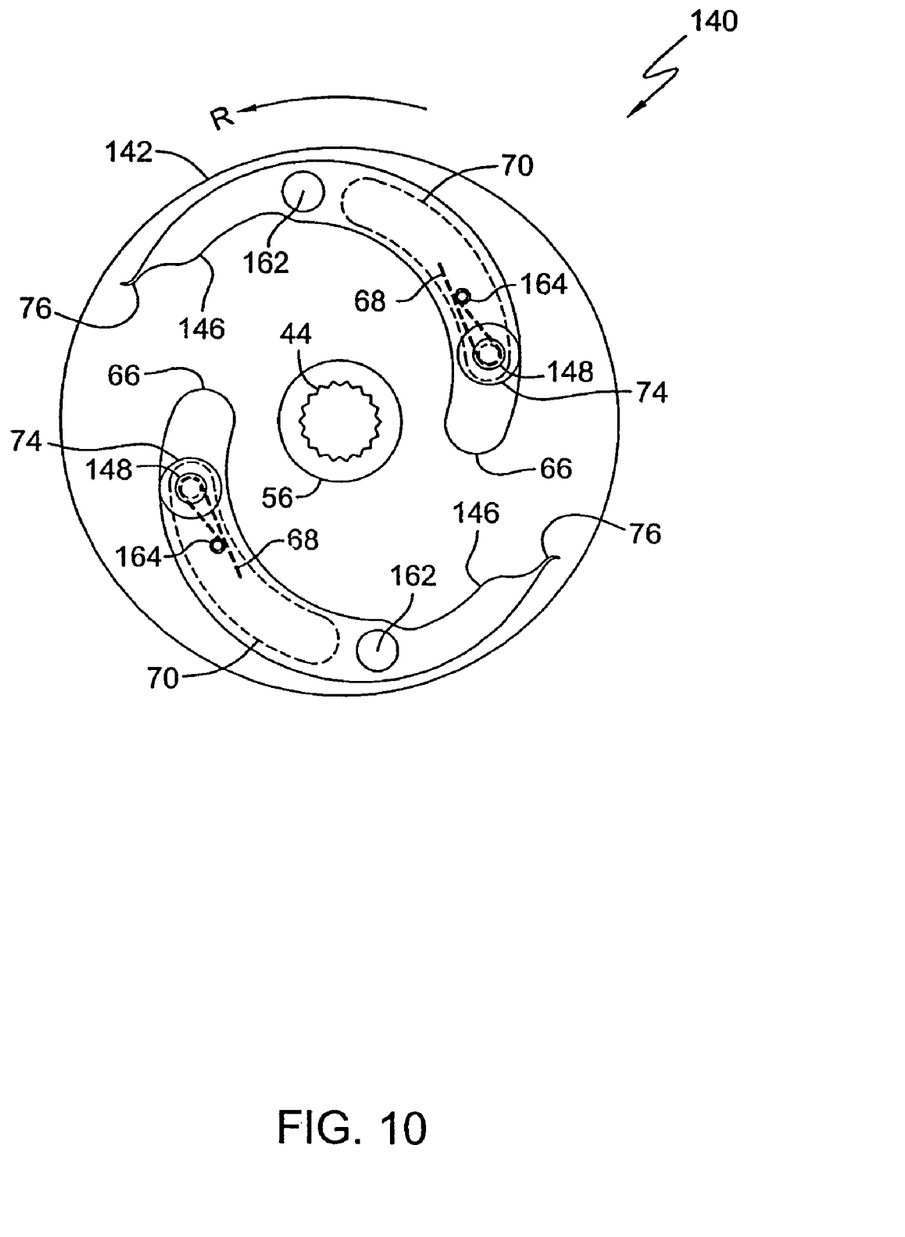
FIG. 10 is a side elevational view of a second embodiment of the rotating element of a direction sensing mechanism with the mechanism rotating in the reverse direction.

FIGS. 8-10 depict a second embodiment of this invention. In this configuration, arms 146 present a generally continuous circle. The amount of fluid driven radially from mechanism 140 by this configuration is less than that of the first embodiment. Also, one end of each arm 146 provides a stop 66 for the opposite arm. Since fluid flow is relatively continuous about the periphery of arms 146 two effects tend to cause arms 146 to swing radially outward when mechanism 140 is rotating in the forward or clockwise direction. First, the high velocity fluid flow will cause a relatively low pressure area adjacent to the radially exterior surface of arms 146, thus causing arms 146 to want to swing open. Second, the arms will be subjected to a centrifugal effect that causes them to want to swing radially outward. To overcome these effects a relatively light spring 68 is provided in an internal portion 70 of each arm that biases the arm toward the position shown in FIG. 8, and each arm 146 has a projection 76 formed to present a hydrodynamic resistance that tends to drive arms 146 toward stops 66 when mechanism 140 is rotating. Further, the mass of arms 146 is minimized as much as possible by means of material removal such as occurs to form internal portion 70 and by means of material selection, for which plastic, aluminum or other similar light weight materials are preferred. Arms 146 rotate about pivots 148, which also serve to locate a portion of spring 68. Spring 68 is mated with stop 164, which limits the outward radial motion of arm 146 in which stop 164 is located.

Magnets 162 are oriented such that their central axis is perpendicular to the plane of the page versus parallel to the plane of the page as shown in the previous embodiment. This enables the user to locate switch 60 in one of several different positions on a side of a casing, as exemplified by the two different switch locations shown in FIG. 2.

FIG. 10 depicts the position of arms 146 in the position where they would pass and actuate switch 60, aided by the force of fluid flow against projection 76. As with the previous embodiment, the strength of magnet 162 and the sensitivity of switch 60 must be chosen so that switch 60 actuates only when magnet 162 is in the vicinity of switch 60, and not when magnet 162 has moved to the position shown in FIG. 8. When mechanism 140 stops rotating, a combination of gravity and the bias of spring 68 acts to move arm 146 into a position to deactivate switch 60 if arms 146 are in the actuated position at the time mechanism 140 stops.

As shown in FIG. 9, arms 146 may be located between spacing washers 74, all of which are positioned on pivots 148. Pivot pins 148 are secured within base 142 by one of a variety of means such as press fit, brazing or threads. Pivot pins 148 feature a head that aids in maintaining the position of washers 74 and arm 146 with sufficient clearance between the head of pin 148 and the components captured by pin 148 to promote movement of arm 146.

Figure 11:
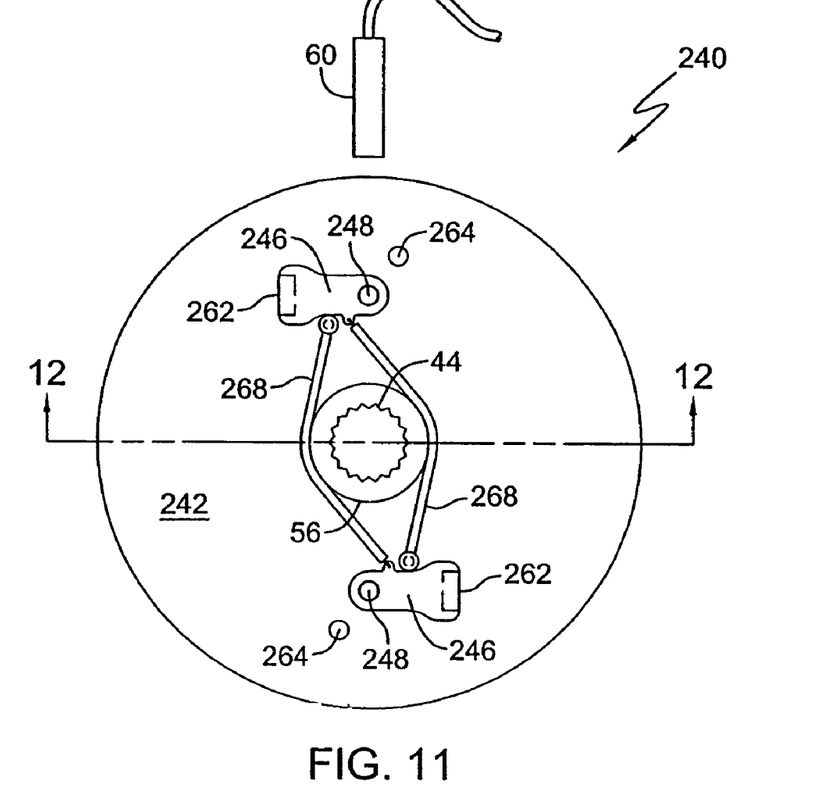
FIG. 11 is a side elevational view of a third embodiment of the rotating element of the present invention.
Figure 12:
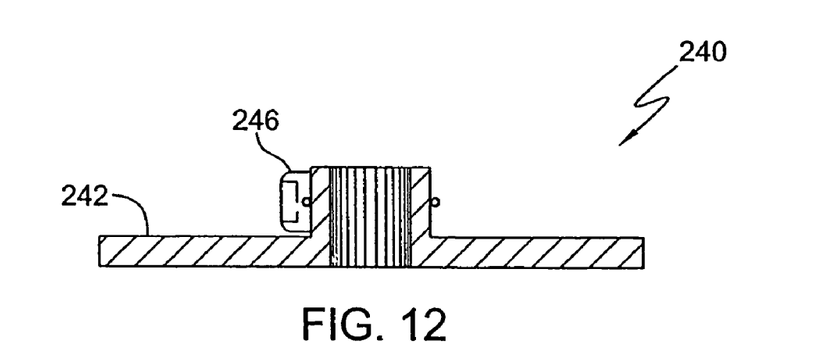
FIG. 12 is a cross-sectional view of the rotating element shown in FIG. 11 along the lines 12-12.
Figure 13:
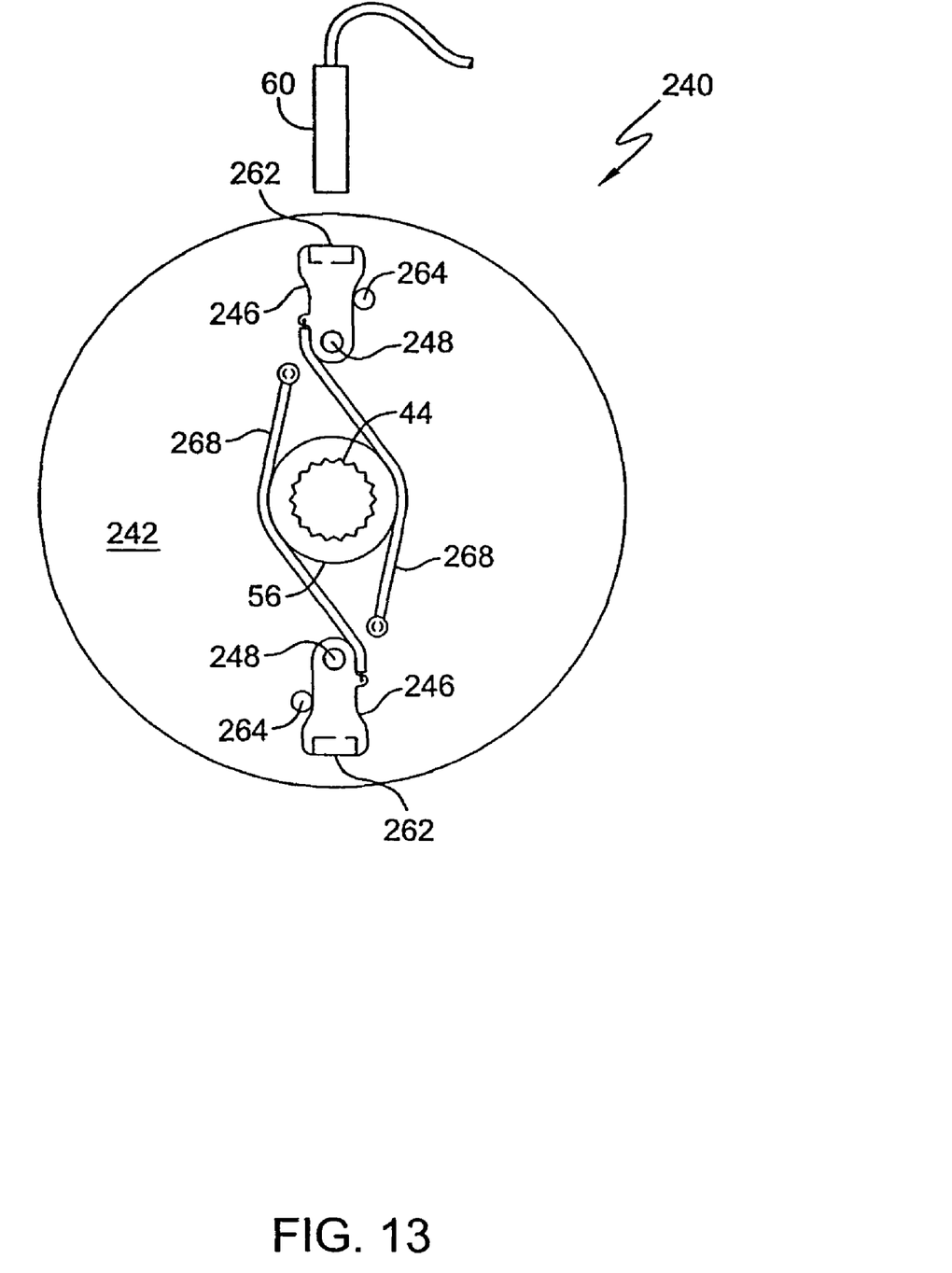
FIG. 13 is a side elevational view of the third embodiment of the rotating element shown in FIG. 11 with the rotating element moving in the reverse direction.

FIGS. 11-13 depict a third embodiment mechanism 240 that similarly operates to rotate arms 246 about pivots 248. Arms 246 in this embodiment rotate about pivot arms 248 due to the centrifugal effect acting upon arms 246. The speed at which arms 246 rotate to an actuated position may be varied by selection of various spring rates for spring 268 and by the shape of arm 246 as well as the location of pivot 248 with respect to the center of mass of arm 246.

Each of the embodiments preferably uses two arms 46, 146 and 246. Having arms uniformly distributed minimizes wobble imparted to the components on which mechanism 40, 140 and 240 are mounted. Such wobble could generate noise and cause damage to bearings or other mounting features. Multiple arms also increases the number of times per revolution that switch 60 is actuated, improving speed of response in some operating conditions.

Figure 14:
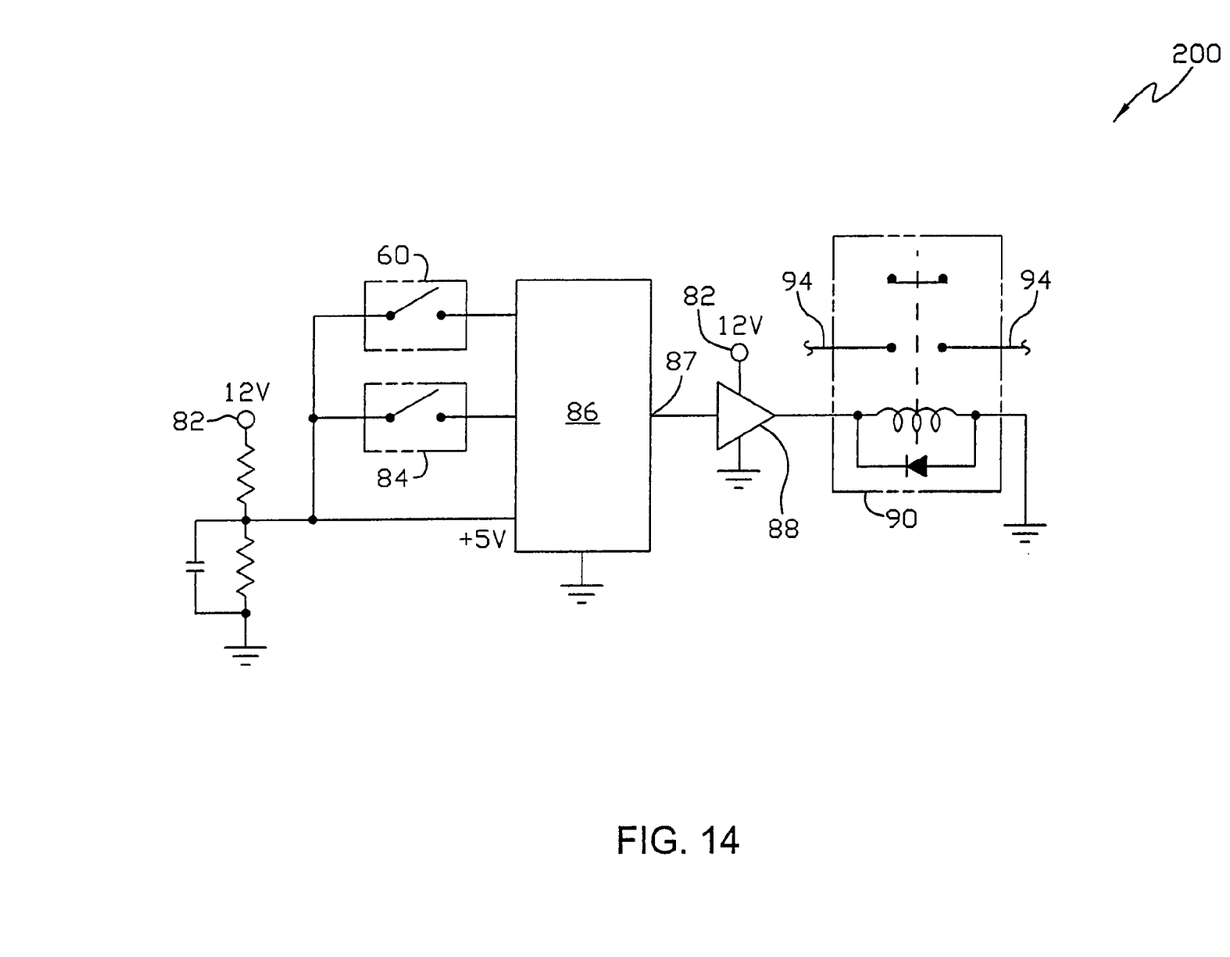
FIG. 14 is an exemplary schematic associated with the various rotating element embodiments.

FIG. 14 depicts an exemplary electrical circuit 200 that may be associated with switch 60. The operation of this circuit is described in more detail by flow diagrams 300 and 400 shown in FIGS. 15 and 16. A voltage source 82 provides the power to circuit 200. Voltage source 82 may be a vehicle battery or other source of electrical energy. Processor 86 functions only when power is supplied to it by means of voltage source 82. Switch 60 provides an input signal to processor 86 by means of wires 37 based on the operating state of the associated sensing mechanism 40, 140, or 240. Switch 84 provides another input signal to processor 86 indicative of the operating state of a vehicle implement, which are mower blades in the preferred embodiment. Processor 86 then determines, considering the state of inputs from switch 60 and switch 84, whether a high or low output signal should be transmitted from output 87. Output 87 may then require amplification by means of an amplifier 88 to then drive a subsequent component such as relay 90. Relay 90 is designed to be closed to enable the function of relay 90 through electrical lines 94, and to be subsequently opened in the event that processor 86 determines the function should be disabled or in the event of circuit failure. While circuit 200 is designed such that powering of relay 90 enables a vehicle system, such as engine run or a blade clutch 92, a person of ordinary skill in the art could readily design a circuit wherein powering of relay 90 would cause a vehicle system to be disabled, including engine run or blade clutch 92.

Because of the nature of switch 60, the amount of time a magnet 62 in any of the embodiments is adjacent to switch 60 is important to the functioning of circuit 200. A reed type switch requires approximately 0.001 seconds to actuate in one embodiment. A Hall switch requires approximately 0.00001 seconds to actuate in one embodiment. Given that magnets 62 are rotating in the various embodiments, each magnet 62 is in a position to actuate switch 60 for a limited amount of time. For the various embodiments shown the magnetic field of magnet 62 sufficient to actuate switch 60 is approximately 0.25 inches in width. The approximate radius at which the magnet is located in the embodiments shown yields a circumference of 11.75 inches. Given the reduction between the final drive gear and the reduction gear of six to one, and given a tire radius of approximately 10 inches, the theoretical maximum reverse speed in which a Reed switch will actuate is approximately 12 miles per hour. With a Hall switch the maximum speed of a vehicle that will allow actuation of the switch has no practical limit as applied to a typical consumer vehicle. The actual speed permissible will depend on a multitude of variables, including on which rotating component mechanism 40 is located, vehicle tire diameter, strength of the magnet, and the switch itself.

Figure 15:
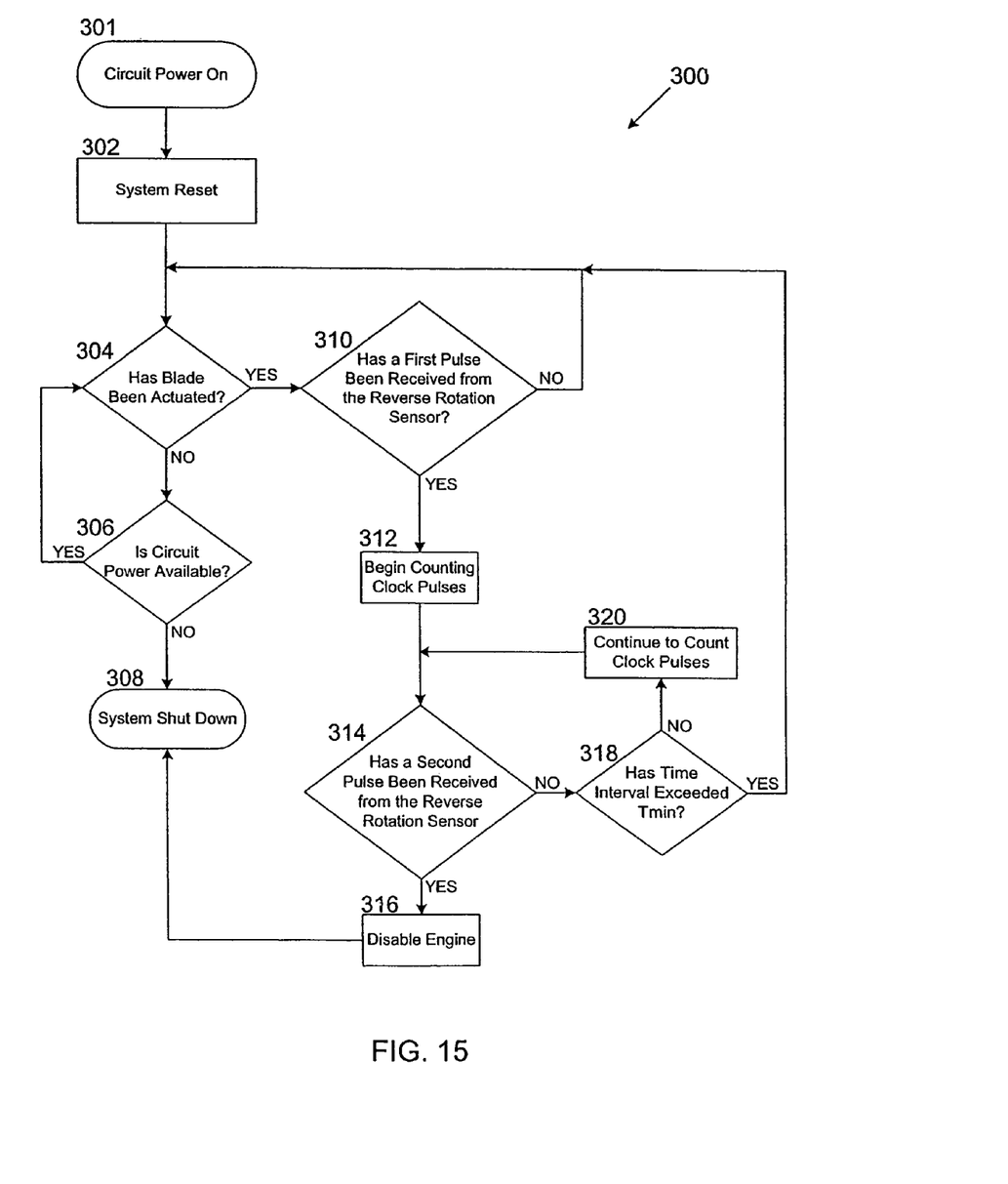
FIG. 15 is a flow chart exemplifying a first embodiment of logic for the schematic shown in FIG. 14.

FIG. 15 is a flow diagram 300 that describes a first implementation of circuit 200 where the vehicle function controlled by relay 90 is disablement of an engine run enable circuit. When the vehicle is turned on power is provided to circuit 200 at step 301. At step 302 the system clears all conditions such that output 87 from processor 86 is initially high, thus enabling relay 90 and permitting continued operation of the vehicle engine by means of wires 94 connected to a run enable circuit. At step 304 the circuit logic checks whether the blade has been actuated, which would be indicated by a voltage signal from switch 84. If the blade has not been actuated then availability of system power at step 306 will determine whether the blade actuation signal will be checked again or whether circuit 200 has been shut down, which would typically occur when the vehicle stops running.

If the blade has been actuated, step 304 will then transfer to step 310 where the status of an electrical signal from switch 60 is checked. If the signal remains low, then the logic returns to step 304 where the status of the mower blades is checked again. If switch 60 has sent a pulse to processor 86, at step 312 processor 86 begins counting pulses from a clock that is internal to processor 86 in the embodiment shown, but may be external to processor 86. At step 314 the processor determines whether a second pulse has been received from switch 60; if a pulse has been received then vehicle engine 29 will be disabled at step 316 by deactivating relay 90, which may also remove power from circuit 200 at step 308. If a second pulse has not been received, comparison of the pulses counted to a pre-programmed time interval will be made at step 318. If a second pulse is not received in the pre-programmed time interval then logic will again determine whether the blade has been actuated at step 304, and the process will begin anew. If the pre-programmed time interval has not yet passed, counting continues at step 320 and determination of whether a second pulse has been received is again made at step 314. A consequence of this design is that circuit 200 may be programmed to allow mowing in reverse to a maximum vehicle speed by adjusting the time interval allowable between two subsequent pulses. Detection of two consecutive pulses is preferred to minimize the chance the system shuts down due to a transient or temporary condition. However, the system could also function by detection of a single pulse, or require the detection of more than two pulses.

Figure 16:
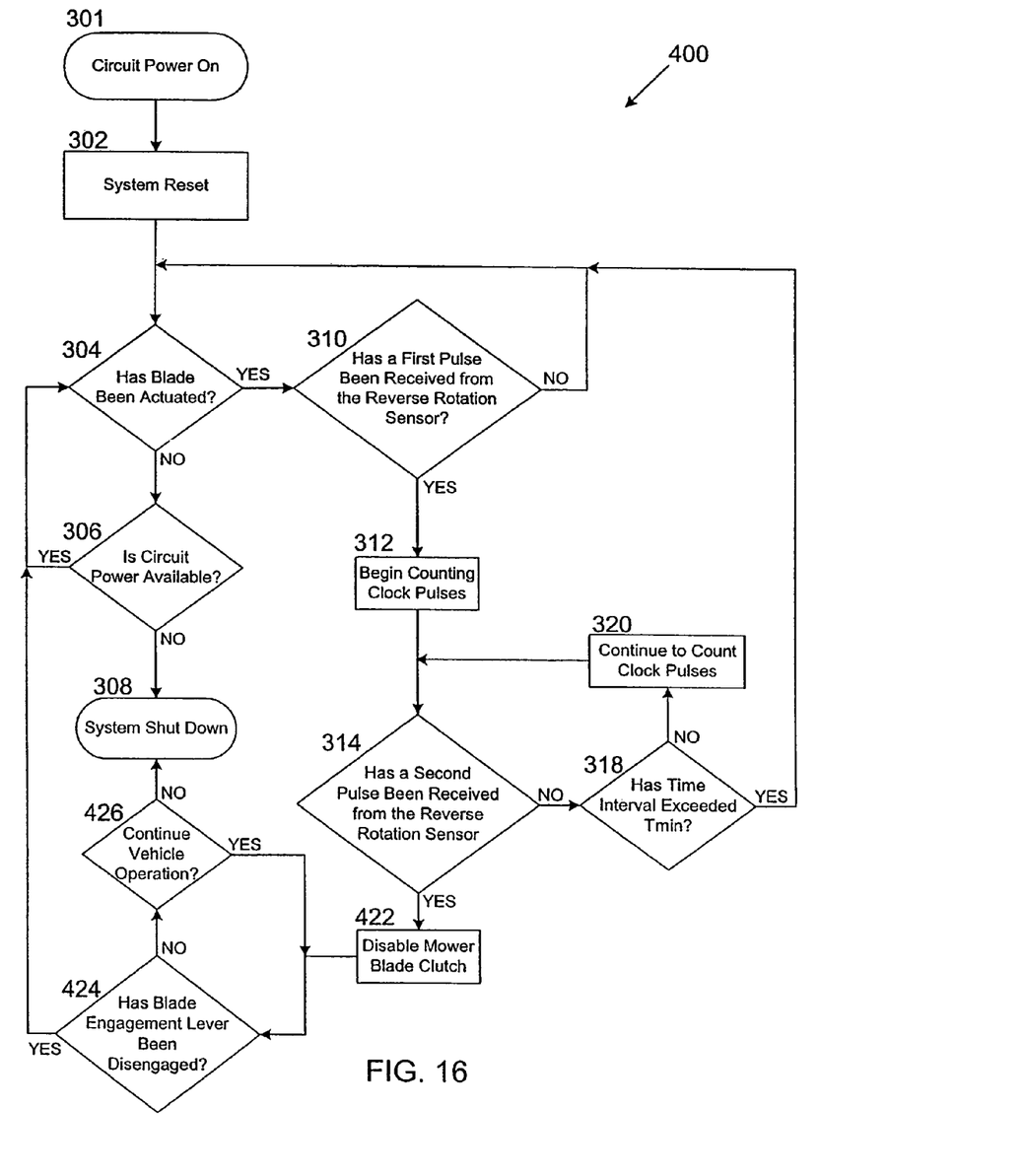
FIG. 16 is a flow chart exemplifying a second embodiment of logic for the schematic shown in FIG. 14.

FIG. 16 is a flow diagram 400 that operates identically to flow diagram 300 shown in FIG. 15 until a second pulse is received from switch 60. If a second pulse is received from switch 60 in the pre-programmed time interval then the mower blade clutch is disabled at step 422. The system will then await a change in state of switch 84 from high to low, thus the blade engagement mechanism on the vehicle will need to be disengaged, as exemplified by step 424, prior to allowing the blade clutch to re-engage. If the blade engagement lever is not disengaged, then eventually a decision will be made to stop vehicle operation at step 426 and the system will shut down at step 308. If the blade is disengaged, then control may proceed to step 304 and the process begins anew.

The embodiments disclosed herein depict a hydrostatic transmission, where the various components are located in a common sump. It will also be understood that appropriate seals will be required for the various components penetrating the housing in such a device, such as switch 60. This invention could also readily be used in mechanical transmissions or transaxles as long as the cavity in which mechanism 40 is located is fluid filled.

Those skilled in the art should understand that various commercially available switches can be used to implement the embodiments described above. In addition to reed switches and Hall switches, suitable switches include inductive proximity switches and magnetic proximity switches. Exemplary inductive proximity switches include models made by Honeywell, and the PRX 800 series available from Sacramento Electronic Supply. Exemplary magnetic proximity switches include the MS-20 proximity switch available from Rodale Technical Sales, Inc. and models made by Jackson Research, Ltd. The switches used must be suitable for the expected operating environment.

It is to be understood that the above description of the invention should not be used to limit the invention, as other embodiments and uses of the various features of this invention will be obvious to one skilled in the art. This invention should be read as limited by the scope of its claims only.

We claim:

1. An apparatus for determining the rotational direction of a rotatable drive component mounted in a housing for a transmission, the apparatus comprising:
    an actuator mechanism engaged to the drive component and comprising at least one arm rotating with the drive component when the drive component is rotating, the arm having a first and a second orientation with respect to the drive component, wherein the arm is in the first orientation when the drive component is rotating in a first direction and the arm is in the second orientation when the drive component is rotating in a second direction; and
    a switch engaged to the actuator mechanism, wherein the switch is off when the arm is in the first orientation and the switch is actuated when the arm is in the second orientation, and wherein the switch is positioned proximate to both the actuator mechanism and the drive component, and the switch does not contact either the actuator mechanism or the drive component.

2. An apparatus as set forth in claim 1 wherein the arm is biased to return to the first orientation.

3. An apparatus as set forth in claim 2, wherein the arm is biased to return to the first orientation by gravity.

4. An apparatus as set forth in claim 2, wherein the arm is biased to return to the first orientation by a spring.

5. An apparatus as set forth in claim 1 further comprising a second arm engaged to the drive component and having a third and a fourth orientation with respect to the drive component.

6. An apparatus as set forth in claim 5, wherein each arm contains a stop to restrain movement of the other arm with respect to the drive component.

7. An apparatus as set forth in claim 1 further comprising a magnet mounted on the arm.

8. An apparatus as set forth in claim 7, wherein the magnet is mounted on an end of the arm.

9. An apparatus as set forth in claim 7, wherein the magnet is mounted on the side of the arm.

10. An apparatus as set forth in claim 1, wherein the switch is mounted inside the housing.

11. An apparatus as set forth in claim 1, wherein the switch causes a change in state of a vehicle component.

12. An apparatus as set forth in claim 1, further comprising stops formed on the drive component to restrain movement of the arm with respect to the drive component.

13. An apparatus for determining the rotational direction of a rotatable drive component in a transmission, the apparatus comprising:
    an actuator mechanism engaged to the drive component and comprising a pair of arms having a first and a second orientation with respect to the drive component, wherein the arms are in the first orientation when the drive component is rotating in a first direction and the arms are in the second orientation when the drive component is rotating in a second direction; and
    a switch engaged to the actuator mechanism, wherein the switch is off when the arms are in the first orientation and the switch is actuated when the arms are in the second orientation, and wherein the switch is positioned proximate to both the actuator mechanism and the drive component, and the switch does not contact either the actuator mechanism or the drive component.

14. An apparatus as set forth in claim 13, wherein the arms are biased to return to the first orientation.

15. An apparatus as set forth in claim 14, wherein each arm comprises a stop to restrain movement of the other arm with respect to the drive component.

16. An apparatus as set forth in claim 14, wherein the transmission comprises a hydrostatic transmission mounted in a vehicle.

17. An apparatus as set forth in claim 16, wherein the first direction corresponds to forward direction of the vehicle and the second direction corresponds to the reverse direction of the vehicle.

18. An apparatus as set forth in claim 14, further comprising a magnet mounted on the end of each arm.

19. An apparatus as set forth in claim 18, wherein the arms are biased to return to the first orientation by gravity.

20. An apparatus as set forth in claim 18, wherein the arms are biased to return to the first orientation by a spring.

21. An apparatus as set forth in claim 13, wherein the switch causes a change in state of a vehicle component.

22. A drive assembly, comprising
    a drive component that is rotatable in either a first direction or a second direction;
    at least one arm associated with the drive component so that the arm rotates with the drive component when the drive component is rotating;
    the arm having a first orientation with respect to the drive component when the drive component is not rotating, and a second orientation with respect to the drive component when the drive component is rotating in the first direction; and
    a switch located adjacent to the drive component such that when the arm is in the first orientation the switch is not actuated and when the arm is in the second orientation the switch is actuated, and wherein the switch does not contact the arm.

23. A drive assembly as set forth in claim 22, wherein the arm is biased to return to the first orientation.

24. A drive assembly as set forth in claim 22, wherein the arm is in the first orientation when the drive component is rotating in the second direction.

25. A drive assembly as set forth in claim 22, further comprising a housing in which the drive component is mounted.

26. A drive assembly as set forth in claim 25, wherein the switch is mounted inside the housing.

27. A vehicle, comprising:

a transmission having a rotatable drive component; and an apparatus for determining the rotational direction of the rotatable drive component comprising:

an actuator mechanism engaged to the drive component and comprising a pair of arms having a first and a second orientation with respect to the drive component, wherein the arms are in the first orientation when the drive component is rotating in a first direction and the arms are in the second orientation when the drive component is rotating in a second direction; and a switch engaged to the actuator mechanism, wherein the switch is off when the arms are in the first orientation and the switch is actuated when the arms are in the second orientation, and wherein the switch is positioned proximate both to the actuator mechanism and the drive component, and the switch does not contact either the actuator mechanism or the drive component.

28. The vehicle as set forth in claim 27, wherein the switch is mounted inside a housing of the transmission and causes a change in state of a vehicle component.

29. The vehicle as set forth in claim 28, wherein the vehicle component comprises a mower blade assembly.

30. The vehicle as set forth in claim 28, wherein the vehicle component comprises an engine.

31. The vehicle as set forth in claim 27, wherein the transmission comprises a hydrostatic transmission.

32. The vehicle as set forth in claim 27, wherein the first direction corresponds to forward direction of the vehicle and the second direction corresponds to the reverse direction of the vehicle.

* * * * *